3,562,237
PREPARATION OF VINYL CHLORIDE POLYMERS
Jean Claude Thomas, Lyon, Rhone, France, assignor to
  Produits Chimiques Pechiney - Saint - Gobain, Paris,
  France
Continuation-in-part of application Ser. No. 347,147,
  Feb. 25, 1964. This application Nov. 30, 1964, Ser.
  No. 414,697
Claims priority, application France, Apr. 30, 1964,
  972,927
Int. Cl. C08f 1/04, 3/30
U.S. Cl. 260—92.8                                    1 Claim

ABSTRACT OF THE DISCLOSURE

Method and apparatus for the polymerization in mass of vinyl chloride and mixtures thereof with vinyl acetate, wherein the monomer is prepolymerized in a first autoclave, under controlled temperature and pressure and at a relatively rapid rate for a relatively short time, until polymerization hass been completed to about 7 to 15%. The flowable mixture of monomer and polymer is then rapidly transferred to a second autoclave wherein polymerization to the desired degree, say 70%, is completed at a slower rate and for a more extended time. The second autoclave is of a type having a tank with vertical axis of symmetry and a helical mixing blade rotating on the axis of symmetry and closely adjacent the walls of the tank, but radially spaced from its axis of rotation. Thereby a tubular column of mixture is continuously moved vertically in contact with the temperature-controlled walls of the ttank, and returns in a central generally cylindrical column along the axis of rotation. Precise and uniform temperature control are thus effected, and granulometry is improved.

---

This application is an improvement of the invention described and claimed in application Ser. No. 347,147, now abandoned, and a continuation-in-part thereof.

In the earlier case there has been described a method of preparing polymers and copolymers of vinyl chloride in mass, that is to say in the absence of solvents and diluents, by polymerizing in a plurality of steps; in a first step the monomer has been polymerized with high speed agitation until about 7 to 15% polymerization has been attained, the polymerization being continued and concluded thereafter with relatively mild agitation, which was yet able to produce good thermal control of the reaction mass. The use of a prepolymerizer autoclave equipped with a high speed agitator, e.g. of turbine type, followed by the use of one or more horizontal autoclaves equipped with relatively slow speed agitators of ribbon blender type, was also described. A further disclosure was made of a prepolymerizer coupled to one or more rotary horizontal autoclaves, the former including high speed agitation and the latter acting by rolling means to generate agitation of the mass. Another disclosure presented a prepolymerizer equipped with a high speed agitator connected to a stationary autoclave utilizing long, blade type stirrers of slow speed extending the length of the autoclave and working near the wall. Finally, there was disclosed a prepolymerizer, equipped with high speed type agitation, connected to a stationary horizontal autoclave equipped with short agitation blades working slowly near the wall and others nearer the axis.

The present invention is intended to perfect and improve the process and apparatus which are set forth in the former case. It is an object of the invention to further modify the type and speed of agitation in the second autoclave while improving the heat exchange and the perfection of the polymer, thus to produce superior products.

According to this invention the first, incomplete stage of polymerization, the prepolymerization, of the vinyl chloride or comonomers is carried out in mass in a prepolymerizer of the high speed type described in the former case, and the subsequent stages are carried out in a cylindrical autoclave of vertical axis provided with vertically operating, helical blades which rotate slowly near the walls. In its preferred form a vertical, axial shaft penetrates the autoclave and rotates helical blades near a wall equipped with a water jacket, moving the peripheral part of the mass along the water jacket at a rate which best control the reaction until the top or bottom of the mass is reached and the peripheral components flow centripetally and axially until they once more engage the water jacket.

In a preferred operation the agitator has helical blades constructed to rotate near the wall to impart an ascending movement to the periphery of the mass, setting up a current which flows inwardly and downwardly about the shaft of the impeller and to the outer wall of the autoclave again, providing a systematic double current and a controlled engagement of every part of the mass with the heat exchanger which is repeated at regular intervals. This also assures good mixing of all parts of the mass and a very homogeneous product.

According to a modification, the helical blades of the agitator may be segmental rather than continuous, each length being a short length of a helix mounted on the shaft to turn near the wall. It is also possible to use a plurality of helical agitators near the wall, and helical agitators or helical segments of short radius operating near the shaft to control and maintain the rate of downflow.

The speeds of the helical agitators required by the main autoclave of this invention are lower than the speeds required by prior art types and processes of polymerization, for instance one tenth to one twentieth of them. This provides a saving in power and more uniform products. For example, a verical autoclave of 2 cubic meters capacity required 75 r.p.m. by prior art processes, but this invention reduces it to 3 to 10 r.p.m.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the invention, reference for this latter purpose being had primarily to the appended claim.

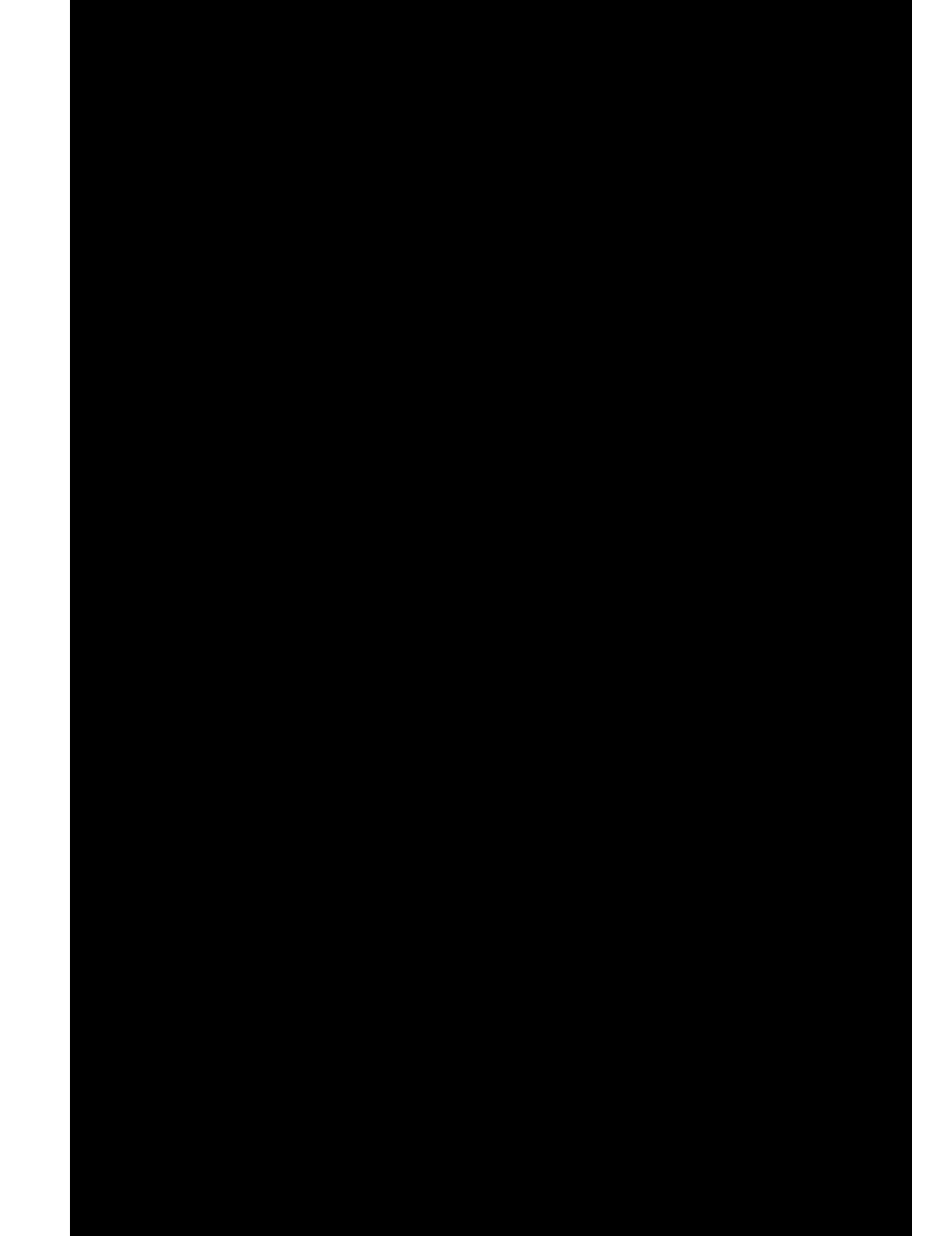

The figure of the drawing is a vertical elevational view, partly in phantom, of a preferred type of apparatus.